Nov. 5, 1963    R. CEFALY    3,109,508
ACOUSTIC STETHOSCOPE
Filed Feb. 11, 1960    3 Sheets-Sheet 1
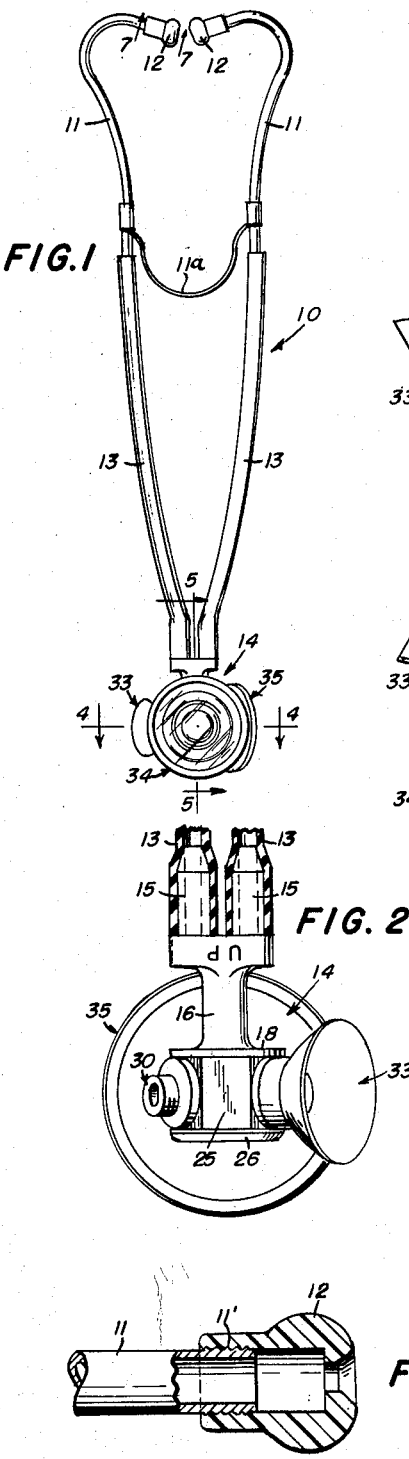
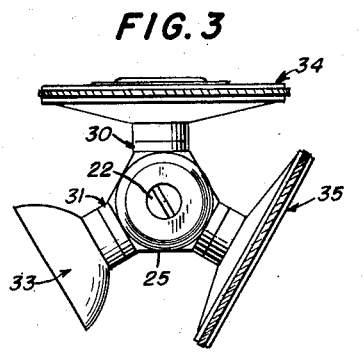
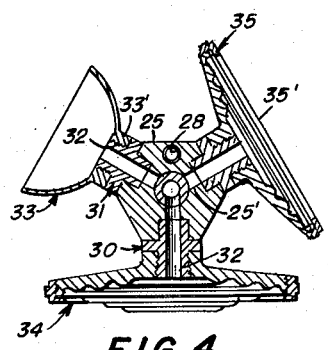
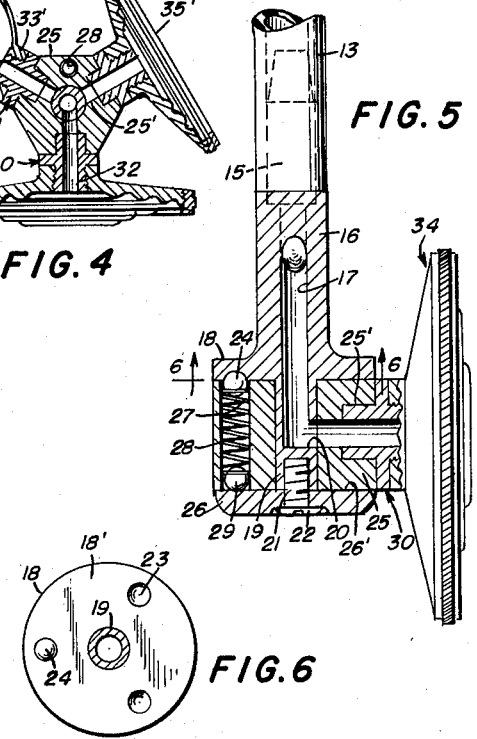
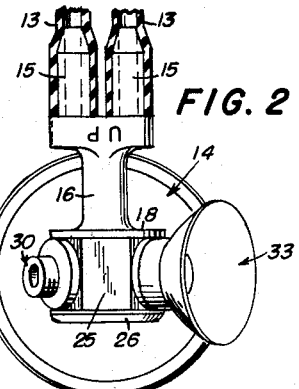
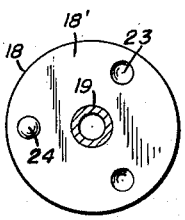
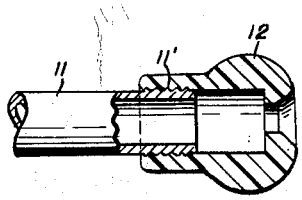
INVENTOR
RALPH CEFALY
BY *Beale & Jones*
ATTORNEYS

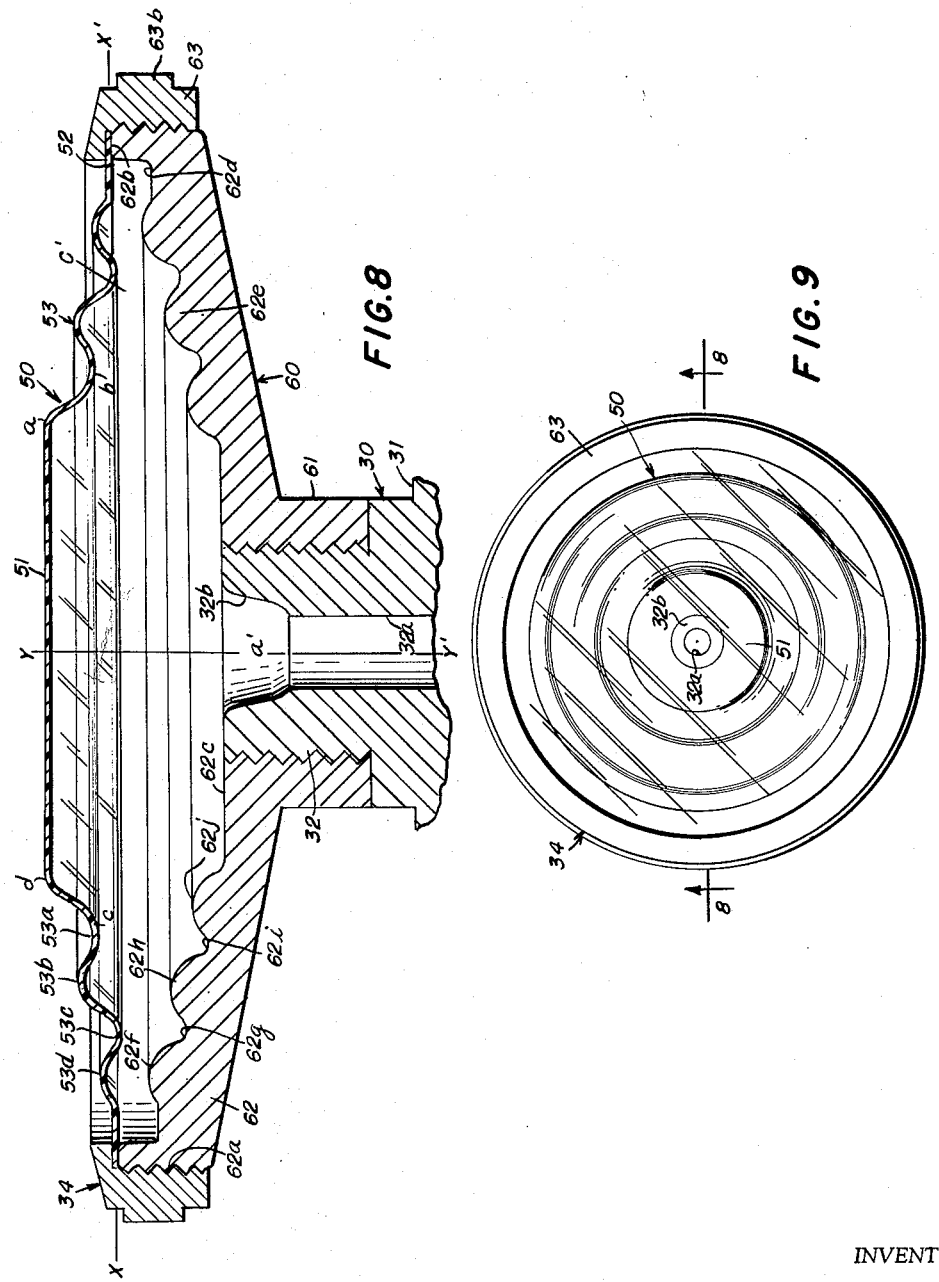

Nov. 5, 1963 R. CEFALY 3,109,508
ACOUSTIC STETHOSCOPE
Filed Feb. 11, 1960 3 Sheets-Sheet 3
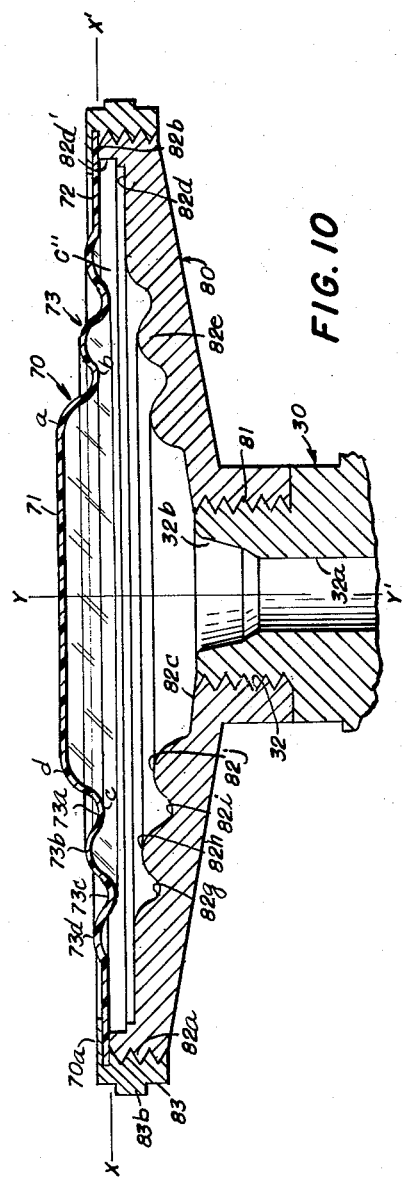
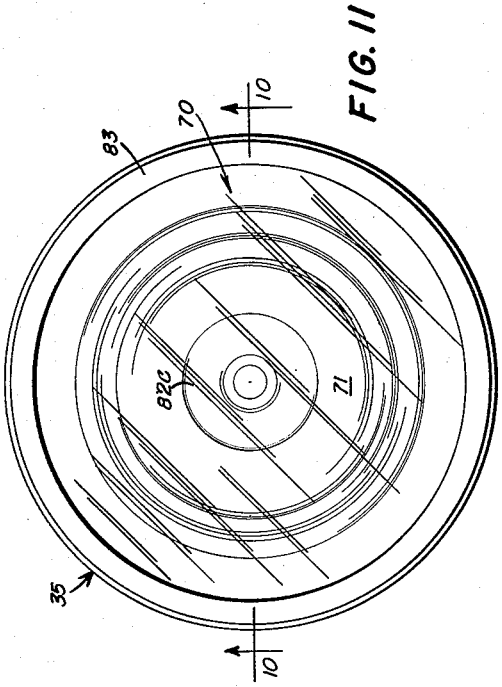
INVENTOR
RALPH CEFALY
BY *Beale & Jones*
ATTORNEYS

United States Patent Office 3,109,508
Patented Nov. 5, 1963

3,109,508
ACOUSTIC STETHOSCOPE
Ralph Cefaly, Brentwood, Md., assignor, by mesne assignments, to Taylor Instrument Companies, Rochester, N.Y., a corporation of New York
Filed Feb. 11, 1960, Ser. No. 8,080
2 Claims. (Cl. 181—24)

This invention relates to improvements in stethoscopes.

It is an object of this invention to provide a highly responsive stethoscope pickup device which will handle a range of frequencies which is essential for the examining physician.

A further object of the invention is to provide a stethoscope with three listening heads each of which serves to pick up a particular range and quality of sound.

A still further object of the invention is to provide in a stethoscope listening head a variable volume sound chamber.

Another object of the invention is to provide in a stethoscope listening head a diaphragm having a portion thereof protruding which contacts the object being sensed so that pressure may be applied to move the diaphragm in order to vary the volume of the sound chamber with which the diaphragm cooperates.

Yet a further object of the invention is to provide a stethoscope listening head that will receive sound with fidelity in the low range of about 16–20 cycles per second and provide amplification thereof having an increased amount of about 10–14 decibels over other known stethoscopes.

A still further object of the invention is to provide a stethoscope with a diaphragm and sound-receiving head mounting the diaphragm that permits the diaphragm to be pressed against the body being sensed thereby to vary the characteristics of the sound chamber formed between the diaphragm and the sound-receiving head.

A further object of the invention is to provide a highly useful stethoscope with three sound-receiving heads wherein any one of the heads may be quickly brought into contact with the body being sensed and wherein one head is of the bell type for local auscultation, one is of the flat diaphragm type which accentuates the high frequencies and at the same time filters the lower range of frequencies and a third type of larger diameter than the flat diaphragm type and having a diaphragm with a protruding portion for body contact and surrounding concave and convex in cross section portions whereby pressure on the diaphragm flexes it to vary the volume of the sound chamber formed by the diaphragm and its mounting head so as to detect and relay a wide range of heart sounds not capable of being picked up for analysis by either of the other two sound-receiving heads.

Still further objects and the entire scope of applicability of the present invention will become apparent from the detailed description given hereinafter. It is to be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of this invention, references may be had to the drawings in which:

FIGURE 1 is an elevational view of the combined stethoscope employing the multiple heads according to this invention;

FIG. 2 is a view on an enlarged scale of the multiple heads with one of the sound-receiving heads removed;

FIG. 3 is an end view of the multiple heads;

FIG. 4 is a cross-sectional view of the multiple heads along line 4—4 of FIG. 1, but on an enlarged scale over that of FIG. 1;

FIG. 5 is a modified view on an enlarged scale of the turret head on line 5—5 of FIG. 1 showing a locking means for holding the swivel head in a selected position;

FIG. 6 is a cross-sectional view along line 6—6 of FIG. 5;

FIG. 7 is an enlarged cross-sectional of an ear piece along line 7—7 of FIG. 1;

FIG. 8 is an enlarged cross-sectional view of the largest listening head as viewed along line 8—8 of FIG. 9;

FIG. 9 is a plan view of the largest listening head having the special diaphragm for varying the sound chamber characteristics;

FIG. 10 is an enlarged vertical cross-sectional view of another modification of the sound-receiving head and diaphragm along line 10—10 of FIG. 11; and FIG. 11 is a top plan view of the modified head in FIG. 10 but on a smaller scale.

Throughout the description like reference numerals and characters refer to similar parts.

In FIG. 1 a stethoscope is generally indicated at 10 and comprises the binaural ear pieces 11—11 held apart by the conventional spring steel member 11a. The ear pieces 11—11 terminate at their upper ends in ear tips 12 which may be threadedly received on the upper ends of members 11 as indicated in FIG. 7 at 11'. Leading from the ear pieces 11 are flexible tubes or conduits 13 which connect the ear pieces in the multiple head, generally indicated at 14.

The multiple head 14 has a bifurcated pair of conduits 15—15 which slidably receive in a secure manner the lower ends of the tubes 13. The bifurcated members 15—15 which are hollow combine into a neck portion 16 having a central passage 17 therein, see FIG. 5, and a circular body portion 18 with a protruding cylindrical boss 19 through which there is an extension of aperture 17. The boss portion 19 is formed with a transverse aperture 20, as best shown in FIG. 5, connecting with the axially extending passage 17 while the extreme lower end of the boss 19 is provided with a threaded screw-receiving recess 21 to receive a securing screw 22, as will be explained. The lower face 18' of the portion 18, as shown in FIG. 6, has formed therein three equally spaced apart hemispherical recesses 23 to receive an upper detent ball bearing 24 therein as will be explained.

Received over the cylindrical boss 19 of member 16 is a main rotary member 25 having an aperture through its center that is received over the boss 19. This main rotary member 25 is in the illustration formed with six sides, as best shown in FIG. 4, and is held engaged over the boss 19 by a circular end plate or washer 26 having a counter sunk central aperture that receives the cap screw 22 flush with the face thereof. In line with any one of the spaced apart apertures 23 in the circular body portion 18 as shown in FIG. 5 and lying on a radius from the center of the aperture 17 and the boss 19 within the member 25 is a vertical aperture 27 which receives and guides a compression spring 28 that presses against the detent or locking ball bearing 24 at the upper end and the ball bearing 29 at the lower end which rests against the inner face 26' of the end plate 26.

The main rotary member 25 has three of its equally spaced apart faces drilled to provide radially extending countersunk recesses 25', see FIGURES 4 and 5, to receive adapters 30 which are press fitted or otherwise soldered into place. Each of the adapters 30 is provided with shoulders 31 and a reduced externally threaded outer end at 32 to receive the respective listening heads or chest pieces as will be explained.

On one of the adapters 30 is received a bell or non-diaphragm sound listening head 33 of about 1⅛ inches in diameter for listening to local auscultation. Bell 33 has an interiorly threaded aperture 33' at its inner end which is received over the outer threaded end 32 of an adapter 30.

A special listening head according to the invention is shown as the largest head at 34. The next larger listening head is indicated at 35 which has the customary flat diaphragm 35'. Each of the listening heads 34 and 35 are alike except for size and diaphragms.

When it is desired to bring a listening head into cooperation with the transverse aperture 20 in the member 16 and leading to the passage 17 therein, it is merely necessary to rotate the main rotary member 25 so that the particular head desired is oppositely positioned from the "Up" indicia on member 16 as shown in FIG. 2. This orientation aligns the particular listening head and its adapter 30 so as to be in line with the selected transverse aperture 20 in the boss 19 on member 16. The main rotary member which mounts the adapters 30 is held in a selected position by the action of the compression spring 28 urging the sphere 24 and 29 outward whereupon sphere 24 is in engagement with the pocket 23 for the selected position.

The listening head 34 as shown in FIGS. 8 and 9 having the particular diaphragm and adjustable feature for varying the size of sound chamber will now be described.

In FIGURES 8 and 9 the diaphragm carrying sound-receiving head is generally indicated at 60 and a diaphragm is generally indicated at 50. This head is of the same configuration as the one in listening head 35 but of larger dimensions. The diameter of listening head 35 is about 1⅝ inches while the diameter of listening head 34 is about 1¾ inches.

The head 60 has a central internally threaded boss 61 which receives the externally threaded end 32 of the adapter 30. The end 32 of the adapter 30 has an axially disposed central sound passage or throat 32a which at its outer end joins head 60 and gradually flares out into a greater diameter at end of throat portion 32b. The head 60 is symmetrical about the axis Y—Y' extending centrally through the boss 61 and the whole head and the diaphragm 50. Formed integrally with the boss portion 61 is a saucer-like portion 62 terminating in an externally threaded rim 62a which has a diaphragm-receiving flat face 62b that lies in a plane X—X' extending perpendicular to axis Y—Y'. Received over the threaded rim 62a which extends parallel to the axis Y—Y' is a bezel ring 63 that secures the diaphragm 50 in place on the face 62b.

The inner face of saucer-like head 62 is formed with a central floor portion 62c having a diameter of about one-third of the whole diameter of the sound-receiving and diaphragm mounting head 60. The head 62 is formed internally so that the outer rim 62a has the upper face 62b thereon spaced above the outer annual rim 62d of the floor portion and thus there is formed between the diaphragm 50 and the head 60, a sound-receiving chamber C'. The saucer-like portion 62 of the head 60 has an intermediate annular portion 62e extending from the annular rim 62d of the floor to the outer boundary of central portion 62c. There is formed in the surface of the intermediate annular portion 62e joined together alternating relatively small concave and convex in cross section portions which are concentric about the circular central floor portion 62c. The sound-receiving and diaphragm carrying head 60 as shown in FIG. 9 is on a 2 to 1 scale of a 1¾ inch diameter head while the cross-sectional view in FIG. 8 is on a scale of 5 to 1 of the 1¾ inch diameter head. In the illustration of the 1¾ inch diameter head 60, the central floor portion 62c is about ⅝ of an inch in diameter and the edge of floor at 62d is spaced below the face 62b about 1/32 of an inch. The annular rim portion of the floor at 62d in the listening head of FIG. 8 is about ⅛ of an inch in width. In the intermediate portion 62e between annular floor portion 62d and center floor portion 62c there is formed the plurality of alternating and concentric convex and concave in cross section portions when proceeding from outward to inward along the floor of head 60 such as convex portion 62f, concave portion 62g, convex portion 62h, concave portion 62i and convex portion 62j.

The diaphragm 50 is formed of plastic sheet material which may be of a cellulose acetate base; for example, one which is heated to make it pliable then it is worked between male and female dies to give it shape. The diaphragm on cooling to room temperature of about 70° F. sets and retains its designed shape. Diaphragm 50 is formed with a central circular protruding vibration pickup portion 51 that is generally flat and is used to apply to the body to be sensed and thus extends in spaced relation outward of the bezel ring 63 by which the rim of the diaphragm is secured to the rim face 62b of bead 62. This central circular pickup portion 51 extends generally coextensive with the center floor portion 62c and the convex ring 62j of the head 60. The center portion 51 of the diaphragm is spaced to the outer side of plane X—X' that contains the flat annular diaphragm receiving face 62b of the head 60. Diaphragm 50 has an annular peripheral portion 52 that is held onto the face 62b by the bezel ring 63. This peripheral portion 52 is about 3/16 of an inch in width and is spaced from the annular floor portion 62d therebelow. The intermediate annular portion generally indicated at 53 between central portion 51 and peripheral annular portion 52 is made up of a plurality of alternating concave and convex in cross section relatively small portions that are concentrically positioned about the center 51. The portions starting concentrically outward of the center portion 51 are concave portion 53a, convex portion 53b, concave portion 53c and convex portion 53d and are generally oppositely disposed to corresponding concave and convex portions in the floor of the head 60. It will be noted that the floor of the head and the diaphragm converge toward each other from about their respective center portions. Thus, when pressure is applied to the diaphragm 50 at its center portion, the diaphragm is distorted and the space volume or sound chamber C' between the floor of head 60 and the diaphragm 50 is varied or decreased which serves to assist in the so-called "tuning in" of the particular sound or vibration to be sensed and thus makes this particular sound-receiving head highly useful to the physician.

The central pick-up portion 51 of the diaphragm 50 is positioned in spaced relation to one side of the plane X—X' as explained above and with the portion of the plane thereadjacent as indicated at points b and c thereon forms a flat bottom and inverted saucer-like shaped in cross section portion a—b—c—d which faces the chamber C' and defines a side portion thereof.

The pressure applied to the sound-receiving head or chest piece as shown at 34 and the structure in FIGS. 8 and 9 tends to move inwardly the diaphragm and decrease the volume in the sound chamber C'. A light pressure applied accentuates the relatively low frequencies being picked up while a firm grip on holding the chest piece with pressure applied tends to accentuate the high frequencies being picked up from within the body being sensed. This is highly advantageous for examination, detection and diagnosis of within body sounds that are being checked by the physician or particular examiner.

The modification shown in FIGS. 10 and 11 is similar to the chest piece shown in FIGS. 8 and 9 but for the most part has a wider marginal horizontal and flat portion both on the diaphragm and on the floor of the head.

In FIGS. 10 and 11 the diaphragm carrying sound-receiving head is generally indicated at 80 and a diaphragm is generally indicated at 70. The diameter of the listening head depicted here is the same as the head in FIG. 8, about 1¾ inches in diameter.

The head 80 has a central internal threaded boss 81 which receives the externally threaded end 32 of the adapter 30 as in the construction depicted for FIG. 8. The end 32 of the adapter 30 has an axially disposed central sound passage or throat 32a which at its outer end joins head 80 and gradually flares out into an increasing diameter at end of throat portion 32b. The head 80 is symmetrical about the axis Y—Y' extending centrally through the boss 81 and the whole head and the diaphragm 70. Formed integrally with the boss portion 81 is a saucer-like portion terminating in an externally threaded rim 82a which has a diaphragm receiving flat face 82b that lies in a plane X—X' extending perpendicular to axis Y—Y'. Received over the threaded rim 82a which extends parallel to the axis Y—Y' is a bezel ring 83 having a securing lip 70a and a protruding boss 83b. This ring 83 secures in place the diaphragm 70 on the face 82b.

The inner face of saucer-like head 80 is formed with a central floor portion 82c slightly slanting downward to its center and having a diameter of about one-third of the whole diameter of the sound-receiving and diaphragm mounting head 80. The head 80 is formed internally so that the outer rim 82a has the upper face 82b thereon spaced above the outer annular rim portion 82d which extends as a horizontal and wider portion as contrasted to the structure in FIG. 8. Thus, by this spacing of diaphragm 70 about the head 80 there is formed a sound-receiving chamber. The annular rim of the floor at 82d has a width of about ⅛ of the whole diameter of the floor of the head 80. The inner vertical wall 82d' surrounding the floor portion 82d is formed with a step therein in the modification shown in FIG. 10. The saucer-like portion of the head 80 has an intermediate annular portion 82e extending from the annular rim 82d of the floor to the outer boundary of central portion 82c. There is formed in the surface of the intermediate annular portion 82e joined together alternating relatively small concave and convex in cross section portions which are concentric about the circular central floor portion 82c. It will be noted that in the modification shown in FIG. 10 there are two convex in cross section concentrically disposed portions in the floor portion as contrasted with three such convex in cross section portions as shown in the structure in FIG. 8. The central floor portion 82c is about ⅜ of an inch in diameter and the marginal edge portion of the floor at 82d is about 3/16 of an inch in width. In the intermediate portion 82e between annular floor portion 82d and center floor portion 82c there is formed the plurality of alternating and concentric convex and concave in cross section portions, starting from outward, such as concave portion 82g, convex portion 82h, concave portion 82i and convex portion 82j.

The diaphragm 70 may be formed of plastic sheet material which may be of a cellulose acetate base as explained heretofore for diaphragm 50 shown in FIG. 8. As shown for diaphragm 50 there is a corresponding central circular protruding vibration pick-up portion 71 that is generally flat and is used to apply to the body to be sensed and thus extends in spaced relation outward of the bezel ring 83 by which the rim of the diaphragm is secured to the rim face 82b of head 80. This central circular pick-up portion 71 extends generally coextensive with the center floor portion 82c and the convex ring 82j of the head 80. The center portion 71 of the diaphragm is spaced to the outer side of plane X—X' that contains the flat annular diaphragm receiving face 82b of the head 80. Diaphragm 70 has an annular peripheral portion 72 that is held onto the face 82b by the bezel ring 83. This peripheral portion 72 is about 3/16 of an inch in width and is spaced from the annular floor portion 82d therebelow. The intermediate annular portion generally indicated at 73 between central portion 71 and peripheral annular portion 72 is made up of a plurality of alternating concave and convex in cross section relatively small portions that are concentrically positioned about the center 71 similar to the construction of the diaphragm 50 in FIG. 8. The portions starting concentrically outward of the center portion 71 are concave portion 73a, convex portion 73b, concave portion 73c and a less extensive convex portion 73d and generally oppositely disposed to corresponding concave and convex portions in the floor of the head 80. It will be noted that the floor of the head and the diaphragm converge toward each other from about their respective center portions. Thus, when pressure is applied to the diaphragm 70 at its center portion, the diaphragm is distorted and the space volume or sound chamber C" between the floor of the head 80 and the diaphragm 70 is varied or decreased which serves to assist in the so-called "tuning in" of the particular sound or vibration to be sensed. It will be noted in contrasting the head of FIG. 8 with the head of FIG. 10 that the vertical spacing of diaphragm with the floor is a little less in the head of FIG. 10 than in the head in FIG. 8.

The central pick-up portion 71 of the diaphragm 70 is positioned in spaced relation to one side of the plane X—X' with the portion of the plane there adjacent as indicated at points b and c thereon which in the structure in FIG. 10 abuts plane X—X' and forms a flat bottom and inverted saucer-like shaped in cross section portion a—b—c—d of the disc 70. In the disc 70 of FIG. 10 it will be noted that the bottom of the concave in cross section portion 73c extends slightly below the plane X—X' in its state of rest.

The same application of chest piece or sound-receiving head in FIG. 10 is used as explained for the head shown in FIG. 8.

Applicant has provided a highly useful stethoscope arrangement and a particularly advantageous sound-receiving head or chest piece structure that permits more accurate detection and diagnosis of within body sounds being sensed.

This application is a continuation-in-part of my copending application Serial No. 769,114, filed October 23, 1958, now U.S. Patent No. 3,020,971.

I claim as my invention:

1. In an acoustic stethoscope having a diaphragm carrying sound-receiving head with a centrally disposed boss having a sound-transmitting passageway therethrough, a diaphragm receiving and securing means and an intermediate portion between the boss and annular diaphragm receiving and securing means tapering downwardly from a point in spaced relation below said diaphragm receiving means to the central boss portion, said intermediate portion having formed therein concentric portions that in cross section take the form of a series of connected concave and convex portions, the innermost portion of the tapering intermediate portion being defined by a generally flat in cross section portion having a diameter of about one-third the diameter of the sound-receiving head, the combination therewith of a diaphragm of circular shape and having an annular peripheral portion secured to said head by said diaphragm receiving and securing means thereon and lying in a plane that extends perpendicular to a central axis extending through the sound transmitting passage through said boss, a central vibration sensing flat portion for application to the body to be sensed, said central portion lying adjacent and spaced outward from said plane and outward of said diaphragm receiving and securing means and an intermediate annular portion joining said central vibration sensing portion and said annular peripheral portion, said central portion having a diameter equal to approximately one-third of the diameter of said diaphragm and lying oppositely disposed from and generally coextensive with said generally flat in cross section portion of said sound-receiving head, said intermediate annular portion being made up of a plurality of sequentially and integrally connected alternating concave and convex in cross section relatively small portions similar to said concave and convex portions in said sound-receiving head and having the major portion of said concave and convex small portions of said diaphragm constituting said intermediate portion lying on the same side of said plane as said central vibration sensing flat portion and extending downwardly and outwardly to join said annular peripheral portion, whereby a sound-receiving and transmitting chamber is formed between said diaphragm and said sound-receiving head and whereby the central vibration sensing portion when applied to a body to be sensed may have varying pressure applied thereto through pressure applied to the diaphragm carrying sound-receiving head to vary the characteristics of said sound-receiving and transmitting chamber.

2. In an acoustic stethoscope having a diaphragm carrying sound-receiving head with a centrally disposed sound-transmitting passageway therethrough, a diaphragm receiving and securing means and an intermediate portion between the passageway and annular diaphragm receiving and securing means tapering downwardly from a point in spaced relation below said diaphragm receiving means to the central passageway, said intermediate portion having formed therein concentric portions that in cross section take the form of a series of connected concave and convex portions, the innermost portion of the tapering intermediate portion being defined by a generally flat in cross section portion having a diameter of about one-third the diameter of the sound-receiving head, the combination therewith of a diaphragm of circular shape and having an annular peripheral portion secured to said head by said diaphragm receiving and securing means thereon and having a portion of said peripheral portion lying in a plane that extends generally perpendicular to a central axis extending through the sound transmitting passage, a central vibration sensing flat portion for application to the body to be sensed, said central portion lying spaced outward from said plane and outward of said diaphragm receiving and securing means and an intermediate annular portion joining said central vibration sensing portion and said annular peripheral portion, said central portion having a diameter equal to approximately one-third of the diameter of said diaphragm and lying oppositely disposed from and generally coextensive with said generally flat in cross section portion of said sound-receiving head, said intermediate annular portion being made up of a plurality of sequentially and integrally connected alternating concave and convex in cross section relatively small portions similar to said concave and convex portions in said sound-receiving head and having the major portion of said concave and convex small portions of said diaphragm constituting said intermediate portion lying on the same side of said plane as said central vibration sensing flat portion and extending downwardly and outwardly to join said annular peripheral portion, whereby a sound-receiving and transmitting chamber is formed between said diaphragm and said sound-receiving head and whereby the central vibration sensing portion when applied to a body to be sensed may have varying pressure applied thereto through pressure applied to the diaphragm carrying sound-receiving head to vary the characteristics of said sound-receiving and transmitting chamber.

References Cited in the file of this patent

UNITED STATES PATENTS

| | | |
|---|---|---|
| 705,934 | Knudson et al. | July 29, 1902 |
| 965,174 | Fuchs | July 26, 1910 |
| 975,596 | Young | Nov. 15, 1910 |
| 1,708,398 | Pilling | Apr. 9, 1929 |
| 1,872,081 | Hawley | Aug. 16, 1932 |
| 1,918,422 | Nystrom | July 18, 1933 |
| 2,311,416 | Salb et al. | Feb. 16, 1943 |
| 2,414,850 | Brandenburg | Jan. 28, 1947 |
| 2,719,594 | Smithline | Oct. 4, 1955 |